United States Patent [19]

Nagaura

[11] 4,405,698
[45] Sep. 20, 1983

[54] SILVER OXIDE CELLS

[75] Inventor: Tooru Nagaura, Koriyama, Japan

[73] Assignee: Sony Eveready Inc., Tokyo, Japan

[21] Appl. No.: 329,351

[22] PCT Filed: Apr. 8, 1981

[86] PCT No.: PCT/JP81/00081

§ 371 Date: Dec. 7, 1981

§ 102(e) Date: Dec. 7, 1981

[87] PCT Pub. No.: WO81/02950

PCT Pub. Date: Oct. 15, 1981

[30] Foreign Application Priority Data

Apr. 9, 1980 [JP] Japan ................................ 55-46584

[51] Int. Cl.³ .................... H01M 10/32; H01M 10/04
[52] U.S. Cl. .................................... 429/219; 29/623.5
[58] Field of Search ................ 429/218, 219, 174; 29/623.1, 623.5

[56] References Cited

U.S. PATENT DOCUMENTS 3,615,858  10/1971  Soto-Krebs ........................ 429/219
3,655,450  4/1972  Soto-Krebs ........................ 429/219

FOREIGN PATENT DOCUMENTS 4911495   10/1970  Japan ................... 429/219
51-11294   4/1976  Japan .
51-71226   7/1976  Japan ................... 429/219
55-100655  7/1980  Japan ................... 429/174
55-154058 12/1980  Japan ................... 429/174

Primary Examiner—Donald L. Walton
Attorney, Agent, or Firm—Cornelius F. O'Brien

[57] ABSTRACT

The silver oxide cell is constructed so as to dispose, at the cathode side, of a cathodic material layer 3 composed of AgO and a reducing layer 4 for reducing AgO and, at the anode side, of an anodic material layer 5 and an electrolyte layer 6 in a container composed of a cathode can 1, an anode cap 2 and a gasket 8. The cathodic material layer 3 is covered at the surface thereof with a reduced layer 9 formed by the reduction of AgO.

The silver oxide cell enables a discharge on the single voltage level as in $Ag_2O$ cells, and is appropriate for large-scale production and favorable in workability.

10 Claims, 6 Drawing Figures

SILVER OXIDE CELLS

TECHNICAL FIELD

The present invention relates to silver oxide cells. The silver oxide cell is a silver (II) oxide cell dischargeable on the single voltage level in a manner like a silver (I) oxide cell.

TECHNICAL BACKGROUND

The silver (II) oxide (AgO) has a power in the order of about 3,200 mAH/cm$^3$ and its power is higher than that of the silver (I) oxide (Ag$_2$O) that has a power in the order of about 1,600 mAH/cm$^3$. The silver (II) oxide, accordingly, is considered to be advantageous as an active material for the cell cathode from the viewpoint of a cell efficiency and cost as compared to the silver (I) oxide. In instances where the silver (II) oxide is applied to a cell, however, the silver (II) oxide (AgO) is converted into the silver (I) oxide and presents a two-stage discharge curve. The two-stage discharge curve is disadvantageous for numerous small size cells which are employed as an electric source for digital devices, quartz watches or the like that require the discharge on the single voltage level.

Heretofore, extensive studies have been made of the discharge of AgO. For example, Wales and Burbank report in *J. Electrochem. Soc.*, 106-1959, that, even if a considerable amount of AgO would remain, the discharge voltage curve represents a single voltage corresponding to the discharge of Ag$_2$O after the surface of AgO is covered thoroughly with Ag$_2$O with discharging. Dirkse also observes in *J. Electrochem. Soc.*, 109-1962, that AgO pellets with their surfaces reduced electrochemically to Ag$_2$O can show the same voltage as Ag$_2$O does. That is, if the AgO pellets are discharged until their surfaces are covered thoroughly with Ag$_2$O, it is found that their voltages can be determined by the amount of the Ag$_2$O present on the surfaces thereof even if AgO would remain in a considerably large amount. It has thus been found that, in order to form a silver oxide cell dischargeable on the single voltage level from silver (II) oxide in such a manner as Ag$_2$O cells, AgO pellets are previously discharged to some extent and cause their surfaces to be covered with Ag$_2$O. Various approaches applying this technology have heretofore been proposed. There are methods, such as, for example, a method involving compression molding Ag$_2$O powders on small-sized AgO pellets that had been previously prepared, and a method involving covering surfaces of AgO pellets with a mixture of silver (I) oxide powders with silver powders. However, the processes which involve covering AgO pellets with Ag$_2$O or Ag and leading by such mechanical means to the state in which the AgO pellets are discharged to some extent offer drawbacks that they are inappropriate for large-scale production and that workability is poor.

In order to improve those drawbacks, some processes have been proposed which involve introducing a reducing material such as Zn, Cd or the like into AgO pellets or a method involving adding a reducing organic material such as formaldehyde, reducing sugar or the like in an electrolyte, thereby leading to a state in which the AgO surface is reduced or discharged. Although these processes can alleviate those drawbacks with respect to workability and large-scale production, they present other disadvantages that the surface of AgO is reduced to a considerable depth to Ag$_2$O and further to Ag and cause the silver (II) oxide to be reduced too much, thereby giving rise to a decrease in a discharge performance. In this case, it is also known that lower than about 10% of capacity has already been discharged after the cell assembly. These result in that part of the energy inherent in AgO has been lost from the cell.

DISCLOSURE OF INVENTION

The silver oxide cells in accordance with the present invention comprises an enclosure of a layer of a cathodic material comprising AgO, a layer of a reducing material capable of reducing to AgO and disposed adjacent to the cathodic material layer, a layer of an anodic material and a layer of an electrolyte.

In accordance with a preferred embodiment of the present invention, the surface of the cathodic material layer of AgO is covered with the AgO reduced layer comprising Ag$_2$O and/or Ag.

The silver oxide cells in accordance with the present invention can provide silver oxide cells which are dischargeable on the single voltage level and which are favorable in workability and large-scale production. They also can provide an improved discharge performance with the energy of AgO retained in a good efficiency.

MOST PREFERRED EMBODIMENTS PRACTICING INVENTION

Figure 1:
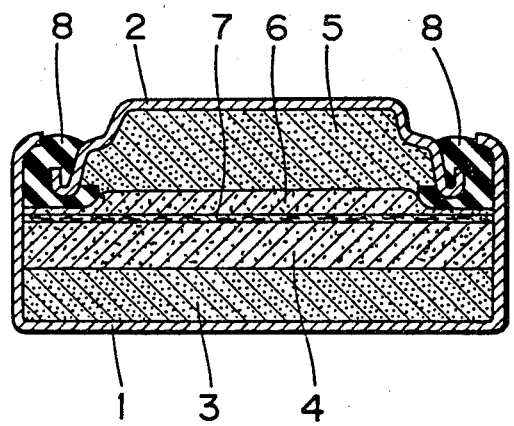
FIG. 1 is a sectional view illustrating an embodiment of the silver oxide cell in accordance with the present invention.

The silver oxide cells in accordance with the present invention have the structures, for example, as shown in FIGS. 1, 2, 4 and 6. These cells are constructed such that a can comprising a cathode can 1 and an anode cap 2 are filled with, on the cathode side, on the one hand, a layer 3 of a cathodic material comprising AgO pellets and a layer 4 of a reducing material comprising a secondary active material for the cathode, which can reduce AgO, and disposed adjacent to the cathodic material layer, and, on the anode side, on the other hand, a layer 5 of an anodic material comprising ZnHg or the like as a major component and a layer 6 of an electrolyte obtainable by the impregnation in, for example, a KOH aqueous solution and disposed adjacent to the anodic material layer. The reducing material layer 4 on the cathode side is partitioned with a separator 7 from the electrolyte layer on the anode side. At the upper side of the can, a gap between the cathode can 1 and the anode cap 2 is sealed with a gasket 8 comprising, for example, nylon, rubber or the like.

The cathode to be employed in the silver oxide cells in accordance with the present invention is constructed by the AgO electrode composed of the cathodic material layer 3 comprising AgO pellets and an electrode of the different type (hereinafter referred to as "the second electrode") and which is composed of the reducing material layer 4 comprising the secondary cathodic active material reducing AgO and which is charged by the oxidation with the AgO electrode.

The AgO pellets constituting the cathodic material layer 3 may be prepared, for example, by forming under pressures silver peroxide powders into pellets in conventional manner. The AgO pellets may be filled under pressures in the cathode can 1 constituting the cell can to form the cathodic material layer 3.

The secondary cathodic active material constituting the reducing material layer 4 may include, for example, nickel oxide, manganese oxide or the like. The reducing material layer 4 (hereinafter called the second electrode) comprising the secondary cathodic active material may be formed, for example, by molding under pressures a conductive secondary material such as graphite, zinc powders or the like with an electrolyte solution into pellets in conventional manner and superposing the pellets on the cathodic material layer 3 in the can and then applying pressures thereto. The second electrode constituting the reducing material layer is preferably readily chargeable as the cathodic of the alkali secondary battery. If the nickel oxide electrode and the manganese electrode are employed by reducing NiOOH and $MnO_2$ in each case with zinc powders, the nickel oxide and the manganese oxide which are chargeable more easily than NiOOH and $MnO_2$, respectively, can preferably be obtained. It is also possible as a matter of course to employ a reducing material such as cadmium powders, hydrogen gas formaldehyde or the like in place of zinc powders. It is of course possible to employ as an electrode, in combination with AgO, nickel oxide or manganese oxide which is chemically prepared and chargeable.

The separator 7 to be disposed adjacent to the reducing material layer may comprise a partition composed of a paper-like material such as cellophane membrane or the like.

The layer 6 prepared by the impregnation with an electrolyte is disposed on the separator 7, and a gasket 8 is disposed on the electrolyte impregnated layer so as to bond to the upper edge portion of the cathode can 1. The cell is then assembled by inserting into the gasket 8 the anode cap 2 enclosing the layer 5 of the anodic material comprising an anode gel consisting mainly of amalgamated zinc.

Figure 2:
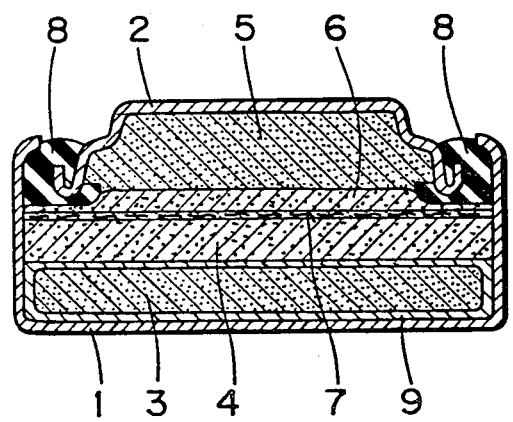
FIG. 2 is a sectional view illustrating the silver oxide cell of FIG. 1 when stored for 1 day after manufacture.
Figure 4:
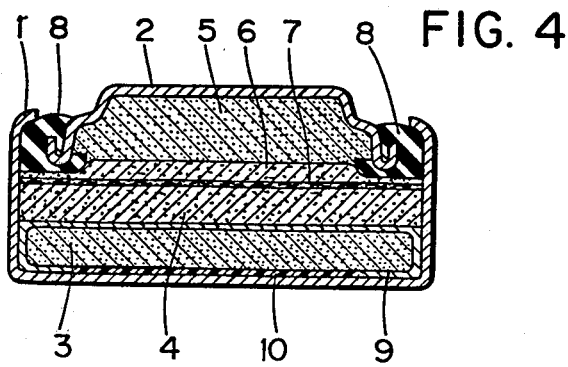
FIG. 4 is a sectional view illustrating another embodiment of the silver oxide cell in accordance with the present invention.
Figure 6:
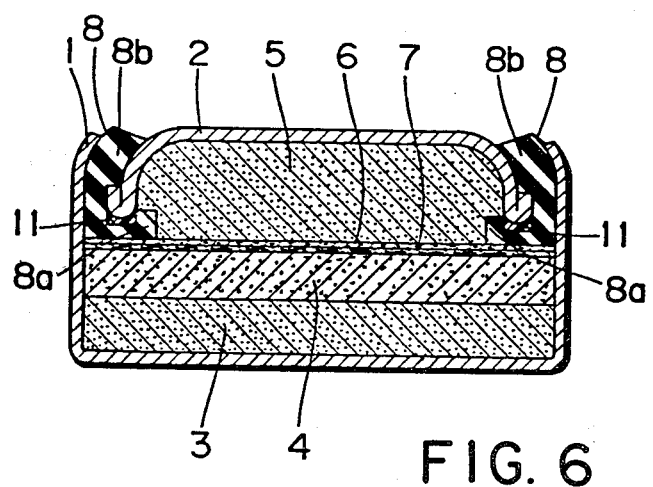
FIG. 6 is a sectional view illustrating another embodiment of the silver oxide cell in accordance with the present invention, in which the gasket of FIG. 5 is assembled.

Variations in the construction of the silver oxide cells in accordance with the present invention from those shown in FIGS. 1 and 2 may have constructions as shown, for example, in FIGS. 4 and 6. As shown in FIG. 4, a circular plastic sheet 10 may be disposed at the center of the inner bottom of the cathode can 1. The sheet 10 renders it difficult to let the electrolyte intrude therebetween by disposing it in contact with the lower surface of the anodic material layer 3. The provision of the sheet can substantially prevent the reduction of AgO so that it provides the same effect as the $Ag_2O$ and/or Ag layer 9 for reducing AgO by previously rendering the area not in use for the reaction.

Figure 5:
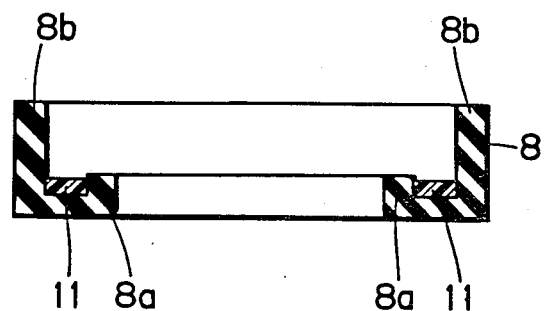
FIG. 5 is a sectional view illustrating another embodiment showing a gasket to be employed for the silver oxide cell in accordance with the present invention.

In accordance with the present invention, in instances where there is employed a gasket for the insertion of the anode cap 2, having shapes as shown, for example, in FIGS. 5 and 6, in addition to the gaskets 8 having the conventional shapes as shown in FIGS. 1, 2, and 4, the lower edge portion of the anode cap 2 can be sealed fluid-tightly with a sealing layer 11 comprising a fluid sealing material disposed in the ring-like groove provided at one end of the gasket.

In accordance with the silver oxide cells of the present invention, as the cathode is composed by the AgO electrode and the second electrode, the AgO electrode is discharged so as to charge the second electrode and consequently change the surface stage into $Ag_2O$ and/or Ag to thereby form the AgO-reduced layer 9 as shown in FIGS. 2 and 4. The changes may be represented by the following reaction equations at the AgO electrode and, for instance, at the $Ni(OH)_2$ electrode in the presence of the electrolyte:

AgO electrode:

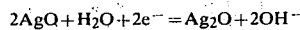
$$2AgO + H_2O + 2e^- = Ag_2O + 2OH^-$$

$Ni(OH)_2$ electrode:

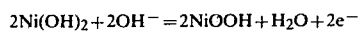
$$2Ni(OH)_2 + 2OH^- = 2NiOOH + H_2O + 2e^-$$

Accordingly, the following reaction occurs at the cathode site:

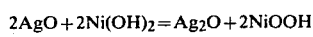
$$2AgO + 2Ni(OH)_2 = Ag_2O + 2NiOOH$$

This means that the AgO electrode is reduced to $Ag_2O$, while the $Ni(OH)_2$ electrode is oxidized to higher oxidized material. In instances where the manganese oxide electrode is employed in place of the $Ni(OH)_2$ electrode, the reaction in combination with AgO proceeds in likewise manner and the manganese oxide is oxidized to higher oxidized material, while the AgO electrode is reduced on the surface thereof to $Ag_2O$ and further to Ag, as shown in the following reaction schemes, thereby covering the surface thereof:

$$AgO + MnO_x^* = Ag_2O + MnO_2$$

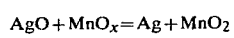
$$AgO + MnO_x = Ag + MnO_2$$

In the aforesaid reaction schemes, $MnO_x^*$ means the discharged state and 'x' is in the range generally larger than 1.7 and smaller than 2.

Accordingly, the reactions in the presence of the electrolyte solution, AgO is reduced by discharge to $Ag_2O$ and further to Ag, while the reducing material is oxidized to higher oxidized material such as NiOOH or $MnO_2$ or the like. As a result, the surface of the cathodic material layer 3 comprising AgO pellets are converted to the AgO-reduced layer 9 of $Ag_2O$ and/or Ag. It is to be noted herein that, as the AgO surface is reduced so as not to be merely consumed, and discharged so as to charge the second electrode, a discharge performance is improved all the more.

In the reactions in the cell in the silver oxide cells in accordance with the present invention $Ag_2O$ is reacted with the Zn electrode to convert $Ag_2O$ into Ag and Zn into ZnO, so that, in the cells of the present invention, the voltage thereof will be determined in the same manner as in conventional silver oxide cells.

In the cathode of the cells in accordance with the present invention, as the AgO surface is converted up to the Ag state, Ag$_2$O is formed by the reaction: AgO+Ag=Ag$_2$O, and the Ag$_2$O is caused to discharge. That is, as AgO is discharged on the voltage level of Ag$_2$O, it is thus to be noted that the AgO surface is efficiently converted to a substance which can be discharged on the single voltage level. At the time when AgO and Ag$_2$O are consumed completely by the repetition of the reaction with Zn, for example, MnO$_2$ or NiOOH is discharged to MnO$_x$ or Ni(OH)$_2$, respectively. At this time, as Zn is consumed in a substantially whole amount by the reaction with AgO, the discharge level of MnO$_2$ or NiOOH decreases rapidly.

As hereinabove set forth, as the cells in accordance with the present invention are provided with the cathode comprising the AgO and second electrodes, the reactions as hereinabove described proceed in the cells after the assembly of the cells, and the first-stage voltage is removed even in the discharge providing substantially the same OCV (open circuit voltage) as Ag$_2$O-zinc cells. It is thus to be noted that manganese oxide and nickel oxide which is charged by the change of AgO to Ag$_2$O or further to Ag can be discharged on the practical cell voltage level ranging generally higher than 1.0 V.

The present invention will be described more in detail. In the working examples, the unit expressed in parts means parts by weight.

EXAMPLE 1

Silver peroxide powders were molded without the addition of a conductive assisting material such as graphite and MnO$_2$ under a pressure of 5.5 tons/cm$^2$ to form an AgO electrode in the form of a pellet and having a weight of 0.37 grams.

83 grams of MnO$_2$, 10 grams of graphite, 20 grams of Zn powders and 7 grams of a 37% KOH solution were mixed well and the mixture in the amount of 0.23 gram was caused to complete the reaction of MnO$_2$ with zinc powders. After the completion of the reaction, the mixture was formed into a pellet under a pressure of 4.5 tons/cm$^2$. Two kinds of the pellets prepared hereinabove were superposed in the same manner as shown in FIG. 1 and filled under pressures in a nickel-plated iron can 1. A separator comprising the electrolyte impregnated layer 6 and a Cellophane membrane 7 was superposed thereon, and a Nylon gasket 8 was mounted. After an electrolyte solution, for example, a 30% KOH aqueous solution, was then injected and sealed by inserting an anode cap 2 enclosing an anode gel 5 consisting mainly of amalgamated zinc, whereby a cell having an outer diameter of 11.6 mm and a height of 4.2 mm.

Figure 3:
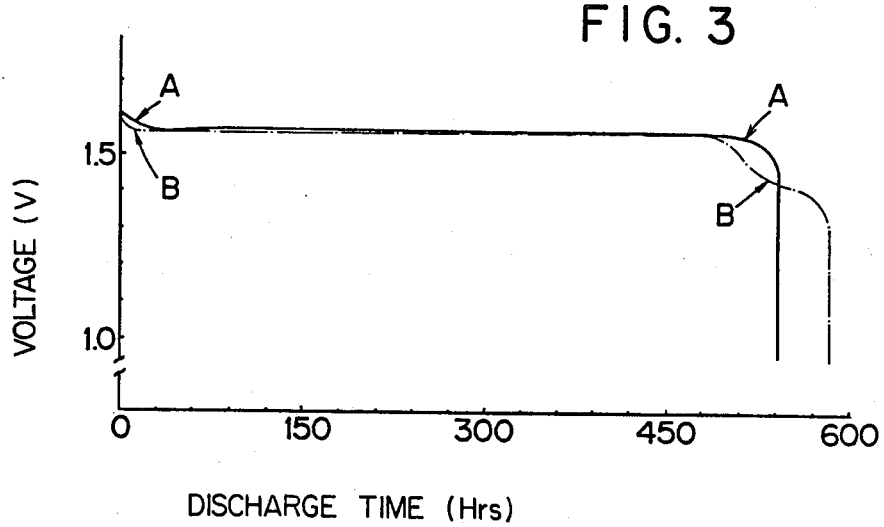
FIG. 3 is a graph illustrating the discharge curve (B) of the silver oxide cell of FIG. 1 as compared to the discharge curve (A) of a conventional type Ag$_2$O cell.

The assembled cell shows performance as shown in a table below as compared to a conventional silver (I) oxide cell. It also provided an open circuit voltage of about 1.58 V and the same cell capacity as a conventional silver (I) oxide cell. The cell did not transform and cause problems even during storage at high temperatures and showed substantially the same discharge curve as that given by the conventional silver (I) oxide cell, as shown in FIG. 3. FIG. 3 indicates the discharge curve given by the continuous discharge at 24° and 6500 ohms, in which the curve A is the discharge curve of the cell obtained in Example 1, whereas the curve B indicates the discharge curve given by the conventional Ag$_2$O cell.

FIG. 2 illustrates the section of the cell stored for one day after manufacture. It is shown therein that the surface of the cathodic material layer 3 comprising the AgO pellets is covered with the reduced layer 9 comprising Ag and/or Ag$_2$O. The cell also provided a sufficient variation in the height of the cell, whereas the conventional AgO cell varied its height in the order of 0.1 mm.

EXAMPLE 2

59 parts of NiOOH obtained by the oxidation of Ni(OH)$_2$ with peroxysulfuric acid, 15 parts of zinc powders, 20 parts of graphite and 6 parts of a 45% KOH solution were mixed well, and 0.20 gram of the mixture was used to cause the exothermic reaction between the zinc powders and NiOOH. After the completion of the reaction, it was formed under a pressure of 4.0 tons/cm$^2$ to a pellet which in turn was superposed on the AgO pellet and filled under pressures into the cathode can in the same manner as in Example 1, thereby assembling a cell. Although it had a little bit higher open circuit voltage of 1.631–1.636 V, the other performances were found to be substantially the same as the cell obtained in Example 1.

EXAMPLE 3

300 ml of an aqueous solution of nickel sulfate hydrate, 42 grams of NaOH and 300 ml of a 6% NaClO aqueous solution were reacted to form a black precipitate (NiOOH) which in turn was mixed well in the amount of 50 parts with 15 parts of zinc powders, 10 parts of graphite and 6 parts of a 45% KOH solution. After the heat generation resulting from the reaction of zinc with NiOOH was terminated, 19 parts of silver oxide were further added thereto and mixed well. The mixture in the amount of 0.24 gram was formed under a pressure of 4.0 tons/cm$^2$ to a pellet. The pellet was then superposed on the AgO pellet to constitute a cathode, and the cell was assembled in the same manner as in Example 1. The cell provided the favorable results in the heavy load discharge and the discharge at low temperatures as compared to the cells obtained in Examples 1 and 2. This is considered to result from the discharge from the silver oxide which was added to the electrode disposed nearby the anode.

EXAMPLE 4

As shown in FIG. 4, a circular plastic sheet 10 was disposed at the center of the can bottom prior to the insertion of the AgO pellet into the cathode can. The AgO pellet and the manganese oxide electrode were superposed thereon and assembled into a cell in the same manner as in Example 1.

It is observed from the cross section of this cell that the reduced layer comprising Ag$_2$O and/or Ag was not substantially formed at the portion where the AgO surface was in contact with the plastic sheet because the reduction on the AgO at that portion did not substantially proceed as compared to the other portions. This results from the fact that, as the electrolyte solution hardly penetrates into the portion where the AgO pellet is in contact with the plastic sheet, the reduction of AgO hardly proceeds to a substantial extent. Thus, the provision of, for example, the plastic sheet on the bottom surface of the cell, as shown in FIG. 4, can prevent the reaction on the surface of the cathodic material layer in advance and serve as improving a cell efficiency.

EXAMPLE 5

A cell having the structure as shown in FIG. 6 was assembled in the same manner as in Examples 1 and 4. In this Example, a gasket 9 having the shape as shown in FIG. 5 was employed. The gasket is provided at the inner periphery with a ring-like small projection 8a, and a fluid such as, for example, a polyamide series resin was coated on a ring-like concave groove between the outer peripheral wall 8b and the inner peripheral wall 8a. Accordingly, where an anode cap 2 was inserted and secured to the ring-like concave groove, the cap was caused to be sealed tight in association with the resin 11 at the lower edge portion thereof. As a result, the electrolyte solution 6 in the cell cannot enable to easily reach the area where the gasket 8 was joined to the cap 2 by the projection 8a of the gasket 8 and, even if reached, it can be effectively prevented from leakage towards the outside by the presence of the resin 11. Moreover, the presence of the resin 11 can serve as fixing the cap 2 in a secured manner.

I claim:

1. A silver oxide cell having a cathodic material comprising AgO, an anodic material, a separator disposed between said anodic material and said cathodic material, and an electrolyte; the improvement wherein a layer of a reaction product is disposed between and in contact with the separator and the cathodic material which layer comprises a reacted mixture of an oxide of manganese or an oxide of nickel, an electrolyte and a reducing material.

2. The cell of claim 1 wherein the reducing material is selected from the group consisting of zinc powder, cadmium powder, and formaldehye.

3. The cell of claim 1 wherein the anodic material is zinc.

4. The silver oxide cell of claim 1 wherein said cathodic material, said layer of reaction product, said separator, said electrolyte and said anodic material are disposed within a can which is sealed by a cap that is insulated from said can by a gasket; and wherein a plastic sheet is disposed between the cathodic material and the inner wall of the can.

5. The silver oxide cell of claim 1 wherein said layer contains a conductive material.

6. A method for producing a silver oxide cell capable of being discharged at a single stage voltage level comprising the steps:
   (a) forming a layer of a cathodic material comprising AgO, a layer of anodic material, a separator, a layer comprising an electrolyte, and a layer comprising an oxide of manganese or an oxide of nickel, a reducing material with respect to said oxide of manganese or oxide of nickel and an electrolyte whereupon said oxide of manganese or said oxide of nickel is reduced; and
   (b) assembling and sealing within a can having an open end said cathodic material on top of which is placed said layer containing the reaction product of the oxide of manganese or the oxide of nickel, the reducing material and the electrolyte; over which is placed said separator and said electrolyte layer and on top of which is placed said anodic material whereupon the reduced oxide of manganese or the reduced oxide of nickel is oxidized by AgO by reducing at least a portion of the surface of AgO to form $Ag_2O$ thereby providing a cell that can be discharged at a single stage voltage level.

7. The method of claim 6 wherein the reducing material is selected from the group consisting of zinc powder, cadmium powder, and formaldehyde.

8. The method of claim 6 wherein the oxide of manganese in said layer is reduced by the reducing material to $MnO_x$ where x is larger than 1.7 and less than 2.

9. The method of claim 6 wherein the oxide of nickel in the layer is reduced by the reducing material to $Ni(OH)_2$.

10. The method of claim 6 wherein the anodic material is zinc and the reducing material is zinc.

* * * * *

UNITED STATES PATENT AND TRADEMARK OFFICE
CERTIFICATE OF CORRECTION

PATENT NO. : 4,405,698
DATED : September 20, 1983
INVENTOR(S) : Nagaura Tooru

It is certified that error appears in the above-identified patent and that said Letters Patent is hereby corrected as shown below:

Column 6, line 5, add the following Table.

--TABLE

|  | AgO Cell of Example 1 | Conventional $Ag_2O$ Cell |
|---|---|---|
| Amount of Silver Used (grams) | 0.312-0.339 | 0.506-0.570 |
| Open Circuit Voltage (V) | 1.582-1.585 | 1.609-1.614 |
| Closed Circuit Voltage (V) (average/minimum) (30 ohm load) | 1.393/1.382 | 1.006/0.906 |
| Capacity (average/minimum) (discharge at 6500 ohms, terminal voltage of 1.3V) | 129.3/127.0 (mAH) | 129.0/127.4 (mAH) |

UNITED STATES PATENT AND TRADEMARK OFFICE
CERTIFICATE OF CORRECTION

PATENT NO. : 4,405,698

DATED : September 20, 1983

INVENTOR(S) : Nagaura Tooru

It is certified that error appears in the above-identified patent and that said Letters Patent is hereby corrected as shown below:

TABLE (CONT'D)

|  | AgO Cell of Example 1 | Conventional $Ag_2O$ Cell |
|---|---|---|
| Variation in Height (mm) (average/maximum) | | |
| Storage for 20 days at 60°C | 0.013/0.016 | -0.005/0.001 |
| Storage for 40 days at 60°C | 0.016/0.019 | -0.006/-0.003-- |

Column 7, line 34, delete "formaldehye" and substitute therefor --formaldehyde--.

Signed and Sealed this

Thirtieth Day of October 1984

[SEAL]

Attest:

GERALD J. MOSSINGHOFF

Attesting Officer

Commissioner of Patents and Trademarks